United States Patent [19]
Spencer et al.

[11] 3,982,778
[45] Sept. 28, 1976

[54] JOINT AND PROCESS FOR FORMING SAME

[75] Inventors: Blaine G. Spencer, Peoria; Kenneth E. Starr, Manito; Carl Theodore Kunze, Peoria, all of Ill.

[73] Assignee: Caterpillar Tractor Co., Peoria, Ill.

[22] Filed: Mar. 13, 1975

[21] Appl. No.: 558,198

[52] U.S. Cl. ............................ 285/222; 285/329; 285/382.4; 29/420.5; 29/523
[51] Int. Cl.² .......................................... F16L 41/00
[58] Field of Search ........... 29/420.5, 523; 285/422, 285/382.4, 329, 222

[56] References Cited
UNITED STATES PATENTS

| 295,593 | 3/1884 | Thayer | 29/523 |
|---|---|---|---|
| 2,252,274 | 4/1941 | Rossheim et al. | 285/382.4 |
| 2,754,577 | 7/1956 | Maxwell | 285/382.4 X |
| 2,913,819 | 11/1959 | Andreotti et al. | 29/420.5 |
| 2,983,660 | 5/1961 | Loeb et al. | 29/420.5 |
| 3,018,547 | 1/1962 | Marskell | 285/382.4 X |
| 3,290,124 | 12/1966 | Holtzclaw, Jr. | 29/420.5 |
| 3,834,003 | 9/1974 | Nayar | 29/420.5 |

FOREIGN PATENTS OR APPLICATIONS

| 683,803 | 12/1966 | Belgium | 285/382.4 |
|---|---|---|---|
| 1,357,771 | 3/1964 | France | 285/382.4 |

*Primary Examiner*—C. W. Lanham
*Assistant Examiner*—V. Rising
*Attorney, Agent, or Firm*—Phillips, Moore, Weissenberger Lempio & Strabala

[57] ABSTRACT

The invention is concerned with an improved joint between tubing and a flange having a hole therethrough into which the tubing is force-fit. The flange is made of powdered metal by placing the powdered metal and a lubricant in a mold, compressing the powdered metal at a pressure of at least about $4 \times 10^7$ Kg. per sq. meter, removing the resulting flange from the mold, initially heaing it in an inert or reducing gas atmosphere to remove the lubricant, heating it further at a higher temperature to cause intermetallic bonding thereof, cooling it to a temperature below about 100°C and dry machining annular channels into the hole in the resulting flange. The joint is formed by placing the tubing within the hole and expanding the tubing outwardly into the channels which extend from the hole. The resulting joint has a much higher resistance to torque than does a similar joint made between tubing and a machined flange of similar or even greater hardness. The invention is further concerned with a process for forming said joint.

13 Claims, 2 Drawing Figures

U.S. Patent  Sept. 28, 1976  3,982,778
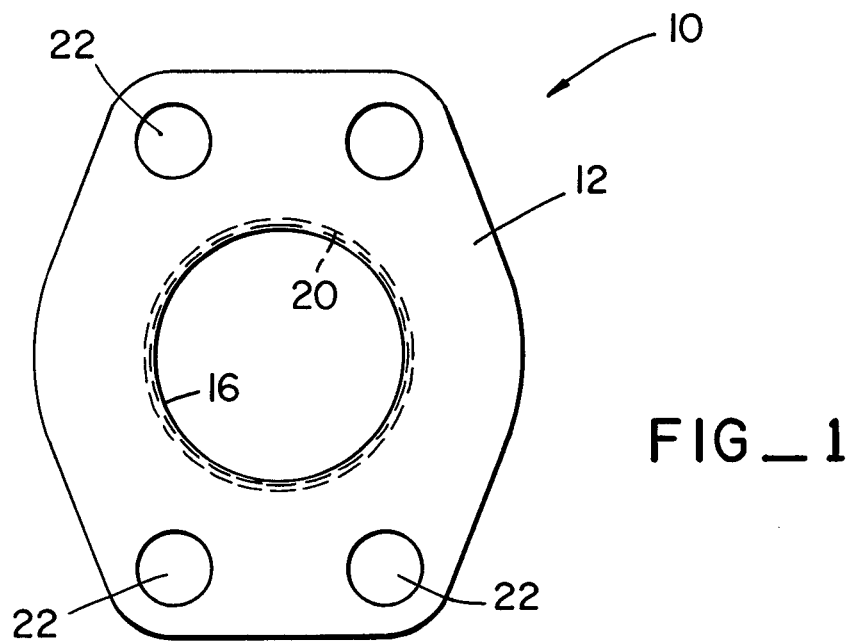
FIG_1
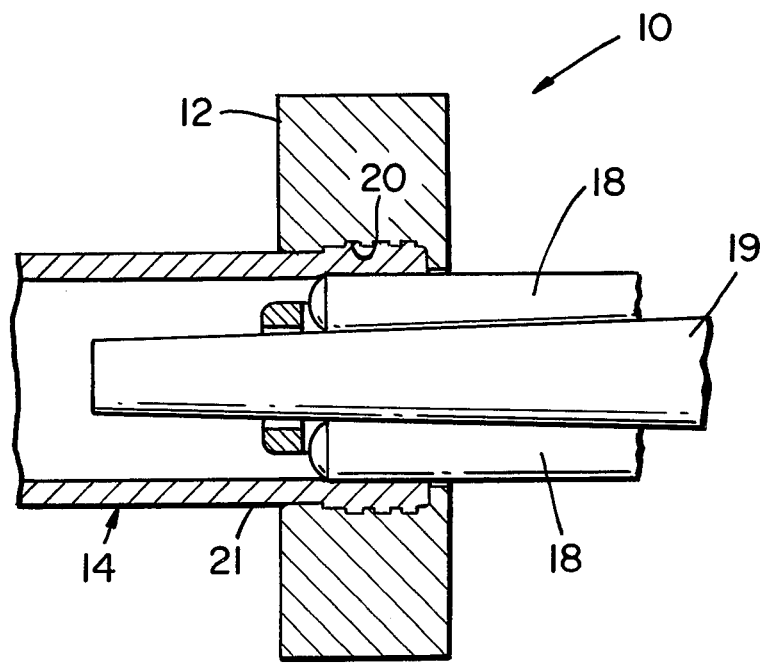
FIG_2

JOINT AND PROCESS FOR FORMING SAME

BACKGROUND OF THE INVENTION

1. Field of the Invention

The invention is concerned with force-fit joints formed between tubing and metallic members such as flanges and more particularly it is concerned with joints of increased torque resistance between tubing and flanges and with a unique and novel process for producing such an improved torque resistant joint by utilizing powdered metal for the formation of the flange portion thereof.

2. Prior Art

The prior art teaches any number of tubing-flange joints. A number of such joints are obtainable wherein the joint has a circular cross section hole therethrough adapted to receive an end of the tube, the hole having at least one annular channel extending therefrom into the flange, by placing an end of the tube within the hole, the end having an external diameter very nearly equal to the diameter of the hole and the tube being formulated of a less hard metal than the flange and forcing an expanding means into the end of the tube and thereby forming a force-fit joint between the exterior of the tube and the hole through the flange. Generally, the prior art flanges have been formulated by machining from metal of a desired hardness, for example, of hardness Rockwell B90 (hardness as referred herein is as measured by ASTM E 18). Such joints have occasionally developed leaks due to lack of a sufficient resistance of the joint to torque which is encountered in many everyday operations using said joint. For example, when said joints are part of the hydraulic systems of heavy earth moving equipment, they are often subjected to sharp torque strains which cause the joints to break loose thus leading to leaking about the joints. Also it is quite expensive to make the flanges for such joints because of the high cost of machinists' labor, especially on machined flanges made of relatively hard metal.

Powdered metal has been used to form a number of parts but has generally not been used for the flanges because of the generally porous nature thereof which is evidenced by a density lower by about 10% than the density of machined metal flanges and because while the outer layer of formed powdered metal parts are known to be hardened, said outer layer is generally very thin and thus one would be led to expect to obtain a weaker joint when using powdered metal than when using machined metal.

Surprisingly, it has been found that when the flange portion of the joint is made from formed powdered metal, the resulting joint is significantly more torque resistant than are similar joints made using identically shaped flanges which are formed from machined metal of substantially the same or even considerably higher measurable Rockwell B hardness as the powdered metal flanges. Since powdered metal flanges are also less expensive than machined metal flanges, this provides a significant and important practical as well as structural advantage.

SUMMARY OF THE INVENTION

Briefly, in one sense the invention comprises an improved force-fit tubing-flange joint comprising a flange having a circular cross section hole therethrough adapted to matingly receive a metallic tube, said flange being formulated by placing a mixture of powdered metal and a lubricant in a flange shaped mold, compressing the mixture at a pressure of at least about $4 \times 10^7$ Kg. per sq. meter in said mold, removing the resulting formed flange from the mold, initially heating it in a non-oxidizing (inert or reducing) gas atmosphere at a temperature which falls within the range from about 500°C to to about 1200°C to substantially remove the lubricant, further heating it at a temperature which falls within the range from about 800°C to about 1500°C, cooling the flange to a temperature of no more than about 100°C, and dry machining an annular channel into the hole in the flange. The joint is formed by placing a tube formulated of a less hard metal than the flange in mating relation within the circular hole, the tube having an external diameter nearly equal to the diameter of the hole, and urging an expanding means into the end of the tube within the hole to force the tube to expand into the annular channel and thereby form the force-fit joint. Preferably the flange is controllably oxidized at an elevated temperature prior to the placing of the tube in the hole through contact with steam in a substantially oxygen-free atmosphere at a temperature above about 340°C for at least about 5 minutes to seal the pores therein.

In another sense the invention comprises a process for formulating the improved joint of the invention.

BRIEF DESCRIPTION OF THE DRAWINGS

The invention will be better understood by reference to the drawings in the figures of which like numbers denote like parts throughout and wherein:

FIG. 1 illustrates an end view of a flange; and

FIG. 2 illustrates in side elevation view in partial section a joint in accordance with the present invention.

DETAILED DESCRIPTION OF THE PREFERRED EMBODIMENT

A joint produced in accordance with the present invention is indicated generally by the numeral 10. The joint is formed between the flange 12 and the tube 14, with the tube 14 being placed within a circular cross section hole 16 which passes through the flange 12 and then being expanded as by driving an expanding means such as the floating or caged roller 18 into the end of the tube 14 which is within the flange by driving a tapered mandril 19 into the center of the floating roller 18 with a rotating motion. The flange includes at least one and preferably a plurality of channels 20 in the hole 16, the annular channels 20 extending from the hole 16 into the flange 12. The floating roller 18 is expanded by insertion of the rotating mandril 19 and serves to expand (cold flow) the exterior surface 21 of the tube 14 into the channels 20 to form a joint between the tube 14 and the flange 12. The flange 12 includes a plurality of bolt holes 22 for attachment to any desired system, e.g., a hydraulic system.

The flange 12 is made of powdered metal or, more particularly, a powdered alloyed iron. Thus, the flange is made by placing the powdered metal and a lubricant such as zinc sterate or the like in a flange shaped mold, compressing the powdered metal within the mold at a pressure of at least about $4 \times 10^7$ Kg. per sq. meter, removing the resulting flange from the mold, initially heating it in a non-oxidizing (an inert or reducing) gas atmosphere, preferably an endothermic gas atmosphere at a temperature which falls within the range from about 500° to about 1200°C to remove said lubricant, heating it further to cause intermetallic bonding thereof at a higher temperature which falls within the range from about 800°C to about 1500°C, said higher temperature preferably being at least about 100°C higher than said initial heating temperature and preferably falling within the range from about 1025°C to about 1225°C, cooling the flange to a temperature below about 100°C, and dry machining (to avoid introduction of oil or dirt) said annular channels 20 into the hole 16 in the flange 12. Preferably the initial heating in an inert or reducing gas atmosphere, preferably an endothermic gas atmosphere, is carried out at a temperature which falls within the range from about 750°C to about 1000°C and most preferably at a temperature which falls within the range from about 850°C to about 890°C. Preferably the cooling reduces the temperature of the flange to about 65°C. Generally the further heating of the flange at a temperature within the range from about 800°C to about 1500°C and the cooling of the flange will also take place in an inert or reducing gas atmosphere, preferably an endothermic gas atmosphere.

An endothermic gas atmosphere is in fact a particular reducing gas atmosphere. So called endothermic gas is commonly generated by reacting methane and air in a heated catalyst filled chamber. Sufficient of the reactants are used so that there is enough oxygen so that the reaction:

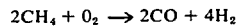
$$2CH_4 + O_2 \rightarrow 2CO + 4H_2$$

proceeds. An excess of oxygen is not used so that formulation of $CO_2$ and/or $H_2O$ (which could oxidize the metal at these temperatures) is prevented. Endothermic gas can also be formed by high temperature reacting of methane and steam by the equation:

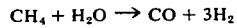
$$CH_4 + H_2O \rightarrow CO + 3H_2$$

In this case, excess steam ($H_2O$) is not used so that the resulting endothermic gas does not have significant water therein.

Preferably the flange 12 prior to the placing of the tube 14 in the hole 16 is clean of all oil, dirt and oxides and then contacted to obtain controlled oxidation thereof with steam at a temperature and for a time sufficient to form a thin adherent hard metal oxide layer on the surface thereof and within the channels 20 and to thereby seal pores in the metal. Generally, the flange 12 should be heated to above about 100°C prior to said contacting to avoid condensation of water thereupon from said steam. The steam serves as a source of oxygen for the controlled oxidation. The preferred joint is made of a iron based alloy and, in that case, the steam contacting is carried out in a substantially oxygen-free atmosphere at a temperature above about 340°C for at least about 5 minutes. Preferably the contacting is at a temperature which falls within the range from about 340°C to about 650°C for a time of at least about one half hour. More preferably, with an iron based alloy, the contacting is carried out at a temperature which falls within the range from about 540°C to about 600°C for a time which falls within the range from about 1 hour to about 2 hours. Under the above conditions, a thin hard iron oxide layer, more particularly, $Fe_3O_4$, perhaps with a small amount of FeO also present, forms on the surface of the hole 16, in the channels 20 and generally on the flange 12. After completion of the contacting with steam, the flange 12 is cooled, generally still in a substantially oxygen-free atmosphere at least until the temperature of the flange has dropped to no more than about 370°C. Thereafter, cooling can be carried out in the air if so desired. For the full effect of the present invention to be realized, it is desirable that the annular channel or channels 20 be extended from the hole 16 into the flange 12 prior to the contacting of the flange with steam whereby the thin hard metal oxide layer is also formed withn the channels 20 and whereby later machining of the channels 20 into the hole 16 cannot cause damage to the thin hard metal oxide layer on the surface of the hole 16, or lead to dirt, oil, etc. accumulation thereon which can serve to at least partially negate the effect of the oxide layer. The treatment with steam primarily serves to close pores within the metal and joints of equal torque resistance can be prepared without the steam treatment.

While not meaning to be bound by theory, it is believed that on a micro scale the surface of a flange made from powdered metal is somewhat uneven. Thus, attempts to twistably loosen the tubing from the metallic member lead to a wedging into the tubing of micro-upstanding portions on the surface of the powdered metal flange with a resulting increased resistance to torsionally applied loads.

It is important to the practice of the present invention, that the surface of the powdered metal flange 12 be completely free of lubricant and the like; thus dry machining of the annular channels 20 is necessitated.

Generally the density of the powdered metal flange after it leaves the mold is about 85% to 92% of the true density of the metal alloy. Expressed differently, if the metal is an iron alloy the density of the powdered metal flange generally falls within the range from about 6.7 to 7.1 grams per cubic centimeter.

Typically the initial heating to remove the lubricant at a temperature which falls within the range from about 500°C to about 1200°C takes place for from about 5 minutes to about 40 minutes. Typically the further heating of the flange at a temperature within the range from about 800°C to about 1500°C continues for from about 10 minutes to about an hour and more generally from about 20 minutes to about 40 minutes. It is during this further high heating treatment that intermetallic bonding within the flange leads to a strengthening of the powdered metal.

EXAMPLE

This example illustrates the improved torque resistance of joints made in accordance with the present invention over prior art joints made using machined metal flanges of like and of greater hardness. Three flanges were machined from SAE 1144 steel. Six flanges were produced from ASTM B 426 powdered metal, the powdered metal flanges being made as described above. Each of the nine flanges had a piece of SAE 1008 mild steel tubing inserted therein and expanded into annular channels in the holes passing therethrough, the channels having been machined into each of the nine flanges by dry machining techniques. Three of the powdered metal flanges were steam treated in an oxygen gas free atmosphere at a temperature of 570°C for 2 hours. The other three powdered metal flanges were not steam treated. Table 1 lists the results of torque testing of the joints formed between the respective flanges and the steel tubing.

| Flange Type | Steam Treatment | Torque Required to Break Joint | ASTM E 18 Rockwell B Hardness |
| --- | --- | --- | --- |
| Machine | No | 612 Nm | 94 |
| Machine | No | 772 | 95 |
| Machine | No | 784 | 95 |
| Powdered Metal | No | 1224 | 82–85 |
| Powdered Metal | No | 1224 | 72–74 |
| Powdered Metal | No | 1088 | 71–73 |
| Powdered Metal | Yes | 1224 | 98 |
| Powdered Metal | Yes | 1224 | 98 |
| Powdered Metal | Yes | 1224 | 98 |

It is clear that the joints made from the powdered metal flanges were significantly more resistant to torque than identical flanges made from machine metal of similar or greater hardness. It is further evident that steam treatment of the powdered metal flanges was not necessary to provide the improved torque resistance. Thus, powdered metal flanges which were considerably lower in hardness than the machined flanges still formed joints which were considerably more torque resistant than joints formed with the machined flanges.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. An improved flange-tube joint comprising a flange formulated by placing a mixture of powdered metal and a lubricant in a flange shaped mold, compressing the mixture at a pressure of at least about $4 \times 10^7$ Kg. per sq. meter in said mold, removing the resulting flange from the mold, initially heating the flange in a non-oxidizing gas atmosphere at a temperature which falls within the range from about 500°C to about 1200°C to remove the lubricant, further heating the flange at a temperature which falls within the range from about 800°C to about 1500°C, cooling the flange to a temperature of no more than about 100°C and dry machining an annular channel into said flange; and a tube having an external diameter nearly equal to the diameter of said hole, one end of said tube being within said hole, said tube being formulated of a less hard metal than said flange, the external surface of said tube being expanded into said channel to thereby form said joint.

2. A joint as in claim 1, wherein said flange, prior to the placing of said tube within said hole is contacted with steam in a substantially oxygen-free atmosphere at a temperature above about 340°C for at least 5 minutes and cooled after completion of said contacting and before formation of said joint.

3. An improved joint as in claim 2, wherein said first heating is carried out at a temperature which falls within the range from about 750°C to about 1000°C and said further heating step is carried out at a temperature which falls within the range from about 1025°C to about 1225°C.

4. A joint as in claim 3, wherein said initial heating step is carried out for a time which falls within the range from about 5 minutes to about 40 minutes and said further heating step is carried out for a time which falls within the range from about 10 minutes to about one hour.

5. A joint as in claim 3, wherein said contacting with steam is carried out at a temperature which falls within the range from about 340°C to about 650°C for at least about one half hour.

6. A joint as in claim 5, wherein said contacting with steam is carried out at a temperature which falls within the range from about 540°C to about 600°C for a time which falls within the range from about 1 hour to about 2 hours.

7. A joint as in claim 6, wherein said annular channel is dry machined into said flange prior to said contacting step.

8. In a process for forming a force-fit tubing-flange joint comprising providing a metallic flange having a circular cross-section hole therethrough adapted to matingly receive a metallic tube, said hole including an annular channel extending therefrom into said flange, placing within said hole one end of said tube, said end having an external diameter nearly equal to the diameter of said hole, said tube being formulated of a less hard metal than said flange, and forcing an expander into said one end of said tube to force said tube to expand into said annular channel thereby forming said force-fit joint, the improvement of increasing the torque strength of said joint comprising:

formulating said flange by placing a mixture of powdered metal and a lubricant in a flange shaped mold, compressing the mixture at a pressure of at least about $4 \times 10^7$ Kg. per sq. meter in said mold, removing the resulting flange from the mold, initially heating it in a non-oxidizing gas atmosphere at a temperature which falls within the range from about 500°C to about 1200°C to remove the lubricant therefrom, further heating it at a temperature which falls within the range from about 800°C to about 1500°C, cooling it to a temperature of no more than about 100°C, and dry machining said annular channel into said flange.

9. An improved process as in claim 8, wherein said first heating step is carried out at a temperature which falls within the range from about 750°C to about 1000°C and said further heating step is carried out at a temperature within the range from about 1025°C to about 1225°C.

10. An improved process as in claim 9, wherein said initial heating step is carried out for a time which falls within the range from about 5 minutes to about 40 minutes and wherein said further heating step is carried out for a time which falls within the range from about 10 minutes to about 1 hour.

11. An improved process as in claim 10, including as an added step:

contacting said flange, prior to the placing of said tube in said hole, with steam in a substantially oxygen-free atmosphere at a temperature above about 340°C for at least about 5 minutes; and cooling said flange after completion of said steam contacting.

12. An improved process as in claim 11, wherein said steam contacting is carried out at a temperature which falls within the range from about 340°C to about 600°C for at least about one half hour.

13. An improved process as in claim 12, wherein said contacting is carried out at a temperature which falls within the range from about 540°C to about 600°C for a time which falls within the range from about 1 hour to about 2 hours.

* * * * *